(12) United States Patent
Stockhammer et al.

(10) Patent No.: US 9,426,196 B2
(45) Date of Patent: Aug. 23, 2016

(54) LIVE TIMING FOR DYNAMIC ADAPTIVE STREAMING OVER HTTP (DASH)

(71) Applicant: QUALCOMM Incorporated, San Diego, CA (US)

(72) Inventors: Thomas Stockhammer, Bergen (DE); Kevin Roland Fall, Bethel Park, PA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 14/146,536

(22) Filed: Jan. 2, 2014

(65) Prior Publication Data

US 2014/0195651 A1    Jul. 10, 2014

Related U.S. Application Data

(60) Provisional application No. 61/749,048, filed on Jan. 4, 2013.

(51) Int. Cl.
| | |
|---|---|
| *G06F 15/16* | (2006.01) |
| *H04L 29/06* | (2006.01) |
| *H04N 21/2343* | (2011.01) |
| *H04N 21/242* | (2011.01) |
| *H04N 21/262* | (2011.01) |
| *H04N 21/43* | (2011.01) |

(Continued)

(52) U.S. Cl.
CPC ........ *H04L 65/601* (2013.01); *H04N 21/23439* (2013.01); *H04N 21/242* (2013.01); *H04N 21/26258* (2013.01); *H04N 21/4305* (2013.01); *H04N 21/6125* (2013.01); *H04N 21/8456* (2013.01)

(58) Field of Classification Search
CPC ........... H04L 65/601; H04N 21/23439; H04N 21/242; H04N 21/26258; H04N 21/4305; H04N 21/6125; H04N 21/8456
USPC ........................................................ 709/219
See application file for complete search history.

(56) References Cited

U.S. PATENT DOCUMENTS

| | | |
|---|---|---|
| 8,495,675 B1 | 7/2013 | Philpott et al. |
| 2007/0110074 A1 | 5/2007 | Bradley et al. |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — John MacIlwinen
*Assistant Examiner* — Tan Doan
(74) *Attorney, Agent, or Firm* — Shumaker & Sieffert, P.A.

(57) ABSTRACT

In one example, a client device for receiving information for streaming of media data includes a clock, and one or more processors configured to receive a media presentation description (MPD) for media content, wherein the MPD includes data indicative of wall-clock times at which the client device can retrieve data of the media content from a source device, and wherein the data indicates a synchronization method by which the client device is to synchronize the wall-clock times with the clock, synchronize the clock with the wall-clock times using the method indicated by the MPD, and request data of the media content from the source device using the synchronized clock. A server device or source device may form and provide such an MPD to a client device.

18 Claims, 4 Drawing Sheets

(51) Int. Cl.
 *H04N 21/61* (2011.01)
 *H04N 21/845* (2011.01)

(56) References Cited

U.S. PATENT DOCUMENTS

| | | | | |
|---|---|---|---|---|
| 2008/0195745 | A1* | 8/2008 | Bowra et al. | 709/231 |
| 2009/0034557 | A1* | 2/2009 | Fluhrer et al. | 370/474 |
| 2010/0049863 | A1* | 2/2010 | Heuer et al. | 709/231 |
| 2011/0096828 | A1 | 4/2011 | Chen et al. | |
| 2012/0198031 | A1* | 8/2012 | Bouazizi | H04L 65/4084 709/219 |
| 2012/0207088 | A1* | 8/2012 | Liu et al. | 370/328 |
| 2012/0259994 | A1 | 10/2012 | Gillies et al. | |
| 2012/0290644 | A1 | 11/2012 | Gabin et al. | |
| 2012/0307747 | A1* | 12/2012 | MacInnis et al. | 370/329 |
| 2013/0107786 | A1 | 5/2013 | Lotfallah et al. | |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

3GPP TSG SA WG4 : "[Draft] LS on HTTP Streaming", 3GPP Draft; S4-100523_LSMPEGHTTPStreamingChangeMarks, 3rd Generation Partnership Project (3GPP), Mobile Competence Centre; 650, Route Des Lucioles; F-06921 Sophia-Antipolis Cedex; France, vol. SA WG4, No. Prague, Czech Republic; 20100621-20100624, Jun. 21-24, 2010, XP050638762, 6 pp.

Editor1 : "HTTP-based Streaming and Download Services—Use cases, requirements and working assumptions: Permanent Document",3GPP Draft; S4-110174-PD-DASHV05, 3rd Generation Partnership Project (3GPP), Mobile Competence Centre; 650, Route Des Lucioles; F-06921 Sophia-Antipolis Cedex; France, vol. SA WG4, No. Berlin, Germany; Jan. 10-14, 2011, XP050475871.

Falchuk et al., "Towards streamed services for co-located collaborative groups", Collaborative Computing: Networking, Applications and Worksharing (Collaboratecom), 2012 8th International Conference on, IEEE, Oct. 14-17, 2012, XP032325775, pp. 306-315.

Tno et al., "WI3208_Use_of HTTP_for_Synchronisation; 22bTD054r1_WI3208_Use_of HTTP_for_Synchronisation", ETSI Draft; 22BTD054R1_WI3208_Use_of_HTTP_for_ Synchronisation, European Telecommunications Standards Institute (ETSI), 650, Route Des Lucioles; F-06921 Sophia-Antipolis; France, vol. zArchive, Dec. 15, 2009, XP014127474, 5 pp.

"Information technology—Dynamic adaptive streaming over HTTP (DASH)—Part 1: Media presentation description and segment formats," ISO/IEC 23009-1, First Edition Apr. 1, 2012, 134 pp.

Keene, et al., "HTTP Time Protocol User's Guide," Version 0.4.10, Jan. 1, 2005, 20 pp.

Fielding, et al., "Hypertext Transfer Protocol—HTTP/ 1.1," Network Working Group, RFC 2616, Jun. 1999, 152 pp.

International Search Report and Written Opinion from International Application No. PCT/US2014/010187, dated Apr. 14, 2014, 13 pp.

Second Written Opinion from International Application No. PCT/US2014/010187, dated Aug. 18, 2014, 7 pp.

International Preliminary Report on Patentability from International Application No. PCT/US2014/010187, dated Mar. 23, 2015, 18 pp.

* cited by examiner

LIVE TIMING FOR DYNAMIC ADAPTIVE STREAMING OVER HTTP (DASH)

This application claims the benefit of U.S. Provisional Application Ser. No. 61/749,048, filed Jan. 4, 2013, the entire content of which is hereby incorporated by reference.

TECHNICAL FIELD

This disclosure relates to transport of encoded media data, such as video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265/MPEG-H Part 2, High Efficiency Video Coding (HEVC), VP8, VP9 and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as the AVC file format or the HEVC file format, or to the MPEG-2 Transport Stream or other encapsulation formats.

SUMMARY

In general, this disclosure describes techniques related to signaling time information for live streaming using, e.g., dynamic adaptive streaming over HTTP (DASH). When performing live streaming, media content can only be prepared for transmission after the content has been received (e.g., recorded) and encoded. In accordance with the techniques of this disclosure, a source device may advertise times, in wall-clock time, at which segments of media content will be available. The source device may ensure that a segment is fully formed by the advertised wall clock time. Furthermore, the source device may advertise a synchronization method by which client devices can synchronize their local clocks with the wall clock times, e.g., to ensure that client and the source device operate on the same time basis. For instance, the source device may advertise network time protocol (NTP), hypertext transfer protocol (HTTP) Timing Protocol (HTP), HTTP date headers or RESTFUL APIs using, for example, the HTTP protocol as a synchronization protocol. The source device may further advertise network addresses for time synchronization servers. The source device may advertise this time synchronization information in a manifest file, such as a media presentation description (MPD).

In one example, a method of receiving information for streaming of media data includes receiving, by a client device, a media presentation description (MPD) for media content, wherein the MPD includes data indicative of wall-clock times at which the client device can retrieve data of the media content from a source device, and wherein the data indicates a synchronization method by which the client device is to synchronize the wall-clock times with a clock of the client device, synchronizing the clock of the client device with the wall-clock times using the method indicated by the MPD, and requesting data of the media content from the source device using the synchronized clock.

In another example, a client device for receiving information for streaming of media data includes a clock, and one or more processors configured to receive a media presentation description (MPD) for media content, wherein the MPD includes data indicative of wall-clock times at which the client device can retrieve data of the media content from a source device, and wherein the data indicates a synchronization method by which the client device is to synchronize the wall-clock times with the clock, synchronize the clock with the wall-clock times using the method indicated by the MPD, and request data of the media content from the source device using the synchronized clock.

In another example, a computer-readable storage medium has stored thereon instructions that, when executed, cause a processor of a client device to receive a media presentation description (MPD) for media content, wherein the MPD includes data indicative of wall-clock times at which the client device can retrieve data of the media content from a source device, and wherein the data indicates a synchronization method by which the client device is to synchronize the wall-clock times with a clock of the client device, synchronize the clock of the client device with the wall-clock times using the method indicated by the MPD, and request data of the media content from the source device using the synchronized clock.

In another example, a method of signaling information for streaming of media data includes generating data for a media presentation description (MPD) for media content, wherein the MPD includes data indicative of wall-clock times at which a client device can retrieve data of the media content from a source device, and wherein the generated data indicates a synchronization method by which the client device is to synchronize the wall-clock times with a clock of the client device, and sending the MPD to the client device.

In another example, a method of signaling information for streaming of media data includes generating data for a media presentation description (MPD) for media content, wherein the MPD indicates more than one method by which a client device can synchronize wall-clock times with a clock of the source device. In one example, the client device may select one or more suitable methods to synchronize with wall clock time. For example, by picking multiple methods, the synchronization with wall clock time may be more accurate.

The details of one or more examples are set forth in the accompanying drawings and the description below. Other features, objects, and advantages will be apparent from the description and drawings, and from the claims.

DETAILED DESCRIPTION

Figure 1:
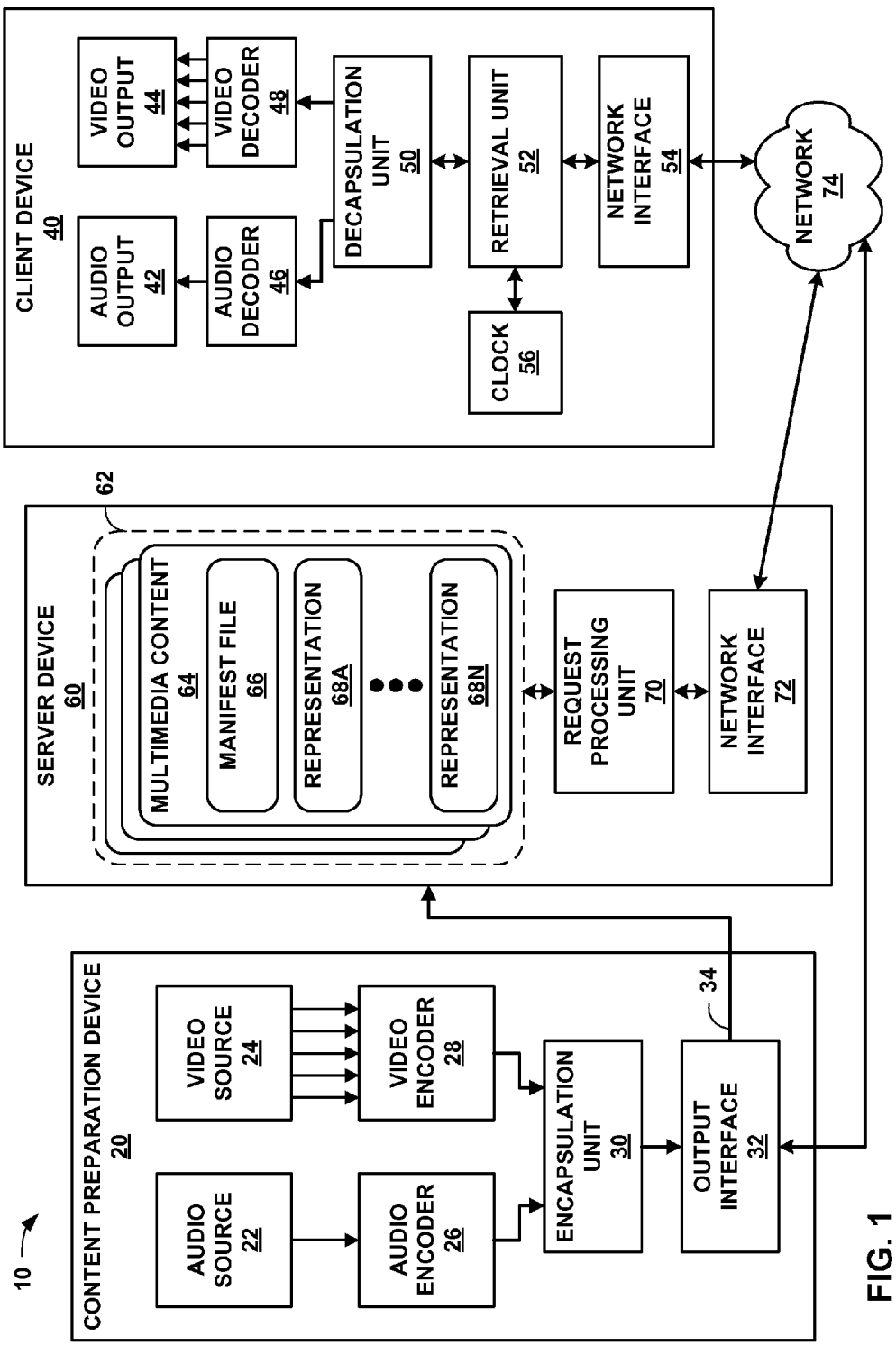
FIG. 1 is a block diagram illustrating an example system that implements techniques for streaming media data over a network.

In general, this disclosure describes techniques for enabling accurate timing between a client and a server in an environment for streaming media data, such as a dynamic adaptive streaming over HTTP (DASH) environment. These techniques may be used to support HTTP Live Streaming (HLS). Although generally discussed with respect to DASH and HLS, the techniques of this disclosure may be applicable to other network streaming protocols. DASH is specified in ISO/IEC 23009-1:2012, "Information technology—Dynamic adaptive streaming over HTTP (DASH)—Part 1: Media presentation description and segment formats," Apr. 1, 2012, available at http://standards.iso.org/ittf/PubliclyAvailableStandards/c057623_ISO_IEC_23009-1_2012.zip. Corrigenda, Amendments and additional additions may be available for the standard of ISO/IEC 23009-1 and the same technologies may apply to any of these extensions.

In HTTP streaming, frequently used operations include GET and partial GET. The GET operation retrieves a whole file associated with a given uniform resource locator (URL) or uniform resource name (URN). The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. Note that, in a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations within one adaptation set may correspond to different coding characteristics (e.g., different profiles or levels of a video coding standard), different coding standards or extensions of coding standards (such as multiview and/or scalable extensions), or different bitrates. Different adaptation sets may contain different source components, for example different audio languages or different video views. The manifest of such adaptation sets, each containing one or multiple representations, may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include an availableStartTime attribute and a start attribute for each period. For media presentations of type "dynamic" (typically used for live services), the sum of the start attribute of the period and the MPD attribute availableStartTime and the duration of the media segment may specify the availability time of the period in Coordinated Universal Time (UTC) format, in particular the first Media Segment of each representation in the corresponding period. For media presentations of type static (typically used for on-demand services), the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more adaptations sets, and each of the adaptation sets may contain one or more representations for the same media content. A representation may be one of a number of alternative encoded versions of audio or video data. The representations may differ by encoding types, e.g., by bitrate, resolution, and/or codec for video data and bitrate, and/or codec for audio data. The term representation may be used to refer to a section of encoded audio or video data corresponding to a particular period of the multimedia content and encoded in a particular way.

Adaptation Sets of a particular period may be assigned to a group indicated by a group attribute in the MPD. Adaptation Sets in the same group are generally considered alternatives to each other. For example, each Adaptation Set of video data for a particular period may be assigned to the same group, such that any of the Adaptation Set may be selected for decoding to display video data of the multimedia content for the corresponding period. The media content within one period may be represented by either one Adaptation Set from group 0, if present, or the combination of at most one Adaptation Set from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Each representation may also include one or more media components, where each media component may correspond to an encoded version of one individual media type, such as audio, video, or timed text (e.g., for closed captioning). Media components may be time-continuous across boundaries of consecutive media segments within one representation.

In general, a DASH client device may access and download an MPD from a DASH server device. That is, the DASH client device may retrieve the MPD for use in initiating a live session. Based on this MPD, and for each selected Representation, DASH client device may make several decisions, including determining what is the latest segment that is available on the server device, determining the segment availability start time of the next segment and possibly future segments, determining when to start playout the segment and from which timeline in the segment, and determining when to get/fetch a new MPD. Once the service is played out, the client device may keep track of drift between the live service and its own playout, which needs to be detected and compensated.

HTTP Live Streaming (HLS) attempts to solve these issues as follows. For each segment that is made available, the server device publishes a new MPD. The client device, after joining the service, retrieves the latest MPD, analyzes the playlist, and then can access the latest segment. The client device then starts playing out the segment and is configured under the expectation that, when playing the segment from the beginning, it can continually access the next segment in time. Before fetching a new segment (or requiring to fetch one), the client device fetches a new MPD providing the location of where to get the latest segment.

SmoothStreaming attempts to solve these issues as follows. For each segment that is made available, the server device publishes a new manifest equivalent to an MPD. The client, after joining the service, retrieves the latest manifest, analyzes the latest segment that is available by getting the "@r" attribute of the SegmentTimeLine of the latest S element. This provides the information indicating where to get the latest segment. The client device then starts playing out the segment and is configured under the expectation that, when playing the segment from the beginning, it can continually access the next segment in time as long as the next request is not before the time resulting from adding the segment duration to the time of the last request. The client therefore continues to construct Segments based on the latest Segment-Timeline.S element without fetching a new manifest until it gets an inband signal that the current manifest is no longer usable. At this point in time (that is, in response to the signal that the current manifest is no longer usable), the client device requests a new manifest.

This disclosure recognizes that the proposed solutions of HLS and SmoothStreaming may encounter similar problems. For example, both HLS and SmoothStreaming update the MPD/playlist/manifest on the server device with each newly available segment. This means that the client device is required to fetch the MPD/playlist/manifest and use the information in the MPD/playlist/manifest whenever it joins a live session. In other words, joining means MPD/playlist/manifest fetching, and the MPD/playlist/manifest needs to be the latest MPD/playlist/manifest. Thus, even if templates are used, the server needs to update the MPD/playlist/manifest to accommodate for an "@r" count change. This accounting needs to be done for each Representation. The MPD/playlist/manifest renewal is especially critical in cases where the MPD/playlist/manifest is distributed through FLUTE (File Delivery over Unidirectional Transport) or needs to be pushed into caches. In this case, along which each new segment, a new MPD/playlist/manifest needs to be pushed.

As another example, the client device does not have information as to at what time the next segment is available/published on the server device. That is, the client device is configured under the expectation that the next segment is published, at the latest, after segment duration time. This can be verified by updating the MPD/playlist prior to fetching a new segment, which is necessary for HLS. Moreover, the client does not have information as to whether any presentation time later than the earliest presentation time of the latest available segment can be played out in order to get closer to the live edge without needing to rebuffer later. As a fact of the loose timing model, and the client not having information as to when the next segment gets available, the client device must be configured under the assumption that the earliest presentation time can played.

Furthermore, the client device does not have information as to whether playout by other client devices that download the same segment are synchronized. In addition, the client device needs to fetch a new MPD when joining the service to obtain the latest information. This "fetching" requires at least one MPD fetch round-trip time, which can impose delay between the request to initiate the live session and the time at which the client device can begin playout.

The main reason for the issues noted above is that the existing techniques of HLS and SmoothStreaming do not provide information on the exact time schedule of the MPD and media segment creation. As an example, if one operates on 10-second segments, the client has little information as to whether the MPD/playlist/manifest had just been published, or whether it will be published shortly after. So, the timing may still be off by up to 10-epsilon seconds with epsilon arbitrarily small but greater than 0. In addition, these techniques of HLS and SmoothStreaming require updating the MPD/playlist/manifest frequently with every newly generated and published segment. No reference clock is available to the client that enables a playout that is closer to the live edge or enables playout synchronized with other clients in the techniques of HLS and SmoothStreaming.

The Moving Pictures Experts Group (MPEG) DASH and DASH-IF DASH-264/AVC techniques also attempt to address this issue. For example, in these techniques, a number-based templating may be used. MPEG-DASH attempts to address the above-mentioned weaknesses. That is, MPEG-DASH attempts to operate closer to the live edge, to synchronize playout of clients that are consuming the same media presentation, to avoid regular updates of the MPD on the server and fetches by the client, and to avoid fetching the MPD in real-time when joining the service.

In particular, MPEG-DASH uses a wall-clock time documented in the MPD, which sets-up the live Media Presentation. MPEG-DASH assumes that the MPD is generated such that the MPD generation process does have access to an accurate clock. This enables client devices that are synchronized to the wall-clock time by any means to operate closer to the live edge. Specifically, the following information is available in the MPD when using a number-template based Representations and using the using the @duration attribute:

MPD@availabilityStartTime: the start time is the anchor for the MPD in wall-clock time. The value is denoted as AST.

MPD@minimumUpdatePeriod: the minimum update period of the MPD. The value is denoted as MUP.

MPD@suggestedPresentationDelay: suggested presentation delay as delta to segment availability start time. The value is denoted as SPD.

MPD@minBufferTime: minimum buffer time, used in conjunction with the @bandwidth attribute of each Representation. The value is denoted as MBT.

MPD@timeShiftBufferDepth: time shift buffer depth of the media presentation. The value is denoted as TSB.

Period@start: the start time of the Period relative to the MPD availability start time. The value is denoted as PS.

SegmentTemplate@startNumber: number of the first segment in the Period. The value is denoted as SSN.

SegmentTemplate@duration: the duration of a segment in units of a time. The value divided by the value of @timescale is denoted as d.

It is assumed that the client device did fetch the MPD at fetch time FT.

Assuming now that the wall-clock time at the client is denoted at WT, then the client device can derive the following information:
- the address of the latest segment that is available on server which requires the latest segment number denoted as LSN
- the segment availability start time of the next segment with number LSN+1 and any other segment SN, denoted as SAST(SN). Note that SN starts with 1.
- The media presentation time within the segment that synchronizes closest to the live edge, MPTL.
- The media presentation time within the segment that synchronizes to other clients, MPTS.
- The time when to fetch a new MPD based on the current presentation time.

An example of the techniques of MPEG-DASH is explained below. In this example, let the MPD include the following information:

```
<MPD availabilityStartTime="2011-12-25T12:30:00"
minimumUpdatePeriod="30s" suggestedPresentationDelay="15s"
minBufferTime="5s"/>
<BaseURL>http://www.example.com/</BaseURL>
<Period start="PT0S"/>
...
</Period>
<Period start="PT0.10S>
...
  <SegmentTemplate timescale="48000" startNumber="22"
  presentationTimeOffset= "2016000" duration="96000"
  initialization="audio/fr/init.mp4a" media= "audio/fr/$Number$.mp4"/>
...
</Period>
```

Assume further that a client device fetches the MPD and the wall-clock time is NTP="2011-12-25T12:30:27." This value is denoted as FT, in this example.

The client device then derives the latest segment number. That is, the client device obtains the latest Period as the Period for which AST+PS<=NTP. If NTP>=AST+PS+d; then at least one segment within this Period is available, and the client device derives the latest segment number (LSN) available on the client as:

$$LSN = \text{floor}(NTP-(AST+PS)-d)/d) + SSN = \text{floor}(15/2) + 22 = 29 \quad (1)$$

The resulting URL is therefore, in this example, derived as http://www.example.com/audio/fr/29.mp4.

The client device then derives the segment availability start time (SAST) for a segment with number SN as:

$$SAST(SN) = AST + PST + (SN - SSN + 1) * d \quad (2)$$

This means that, in this example, for SN=30, the SAST (SN=30)=2011-12-25T12:30:28.

The client device then schedules the playout based on the available information in the MPD. The client device determines the media presentation time in the Period for each Representation as presentation time value in the media segments minus the value of the @presentationTimeOffset, if present, for each Representation. Each segment with segment number SN includes an earliest presentation time, denoted by EPT(SN).

By offering an MPD, in MPEG-DASH, it is guaranteed that:
1. Each segment in this Period is available prior to its earliest presentation time, i.e., for all SN, EPT(SN)>=SAST(SN)−(AST+PST).
2. If each segment with segment number SN is delivered starting at SAST(SN) over a constant bitrate channel with bitrate equal to value of the @bandwidth attribute, then each presentation time PT is available at the client latest at time PT+(AST+PST)+MBT.
3. A recommended playout-time MPTS (PT) for a presentation time when operating in sync with other clients is MPTS(PT)=(AST+PST)+PT+SPD.
4. Each segment in this Period is available at least until SAST(SN)+TSB+d.

Using this information, the client device can start scheduling playout, taking into account the information in the MPD as well the download speed. A suitable playout time is POT (PT)=MPTS(PT), if the attribute @suggestedPresentationDelay is present. If @ suggestedPresentationDelay is not present, then a suitable playout time takes into account the first, second, and fourth constraints above, i.e., the segment availability times at the server as well as the bitrate variability of the media stream.

The client device uses the MPD to construct segments while the MPD is valid. In particular, the client device uses the MPD to construct segments until media time FT+MUP. That is, the greatest segment number (GSN) that can be constructed is:

$$GSN = \text{ceil}(FT+MUP-(AST+PS)-d)/d) + SSN = \text{ceil}(45/2) + 22 = 45 \quad (3)$$

It should be understood that the latest segment may be shorter than the other segments. Before fetching any data beyond segment number 45, in the example above, the client device needs to fetch a new MPD, in accordance with MPEG-DASH.

More generally, to use the same concept with different timing and addressing schemes in DASH, the following values are introduced according to ISO/IEC 23009-1:
- the position of the segment in the Period denoted as k with k=1, 2, . . . .
- the MPD start time of the segment at position k, referred to as MST(k)
- the MPD duration of a segment at position k, referred to as MD(k).

Assuming now that the wall-clock time at the client device is denoted as WT, the client device can derive the following information:
1. The latest available Period on the server, denoted by its period start time PST*
2. The segment availability start time of any segment at position k within the Period, denoted as SAST(k).
3. The position of the latest segment that is available on server in the Period, referred to as k*
4. The address of the latest segment that is available on server
5. The time when to fetch a new MPD based on the current presentation time, or more specifically, the greatest segment position k' within this Period that can be constructed by this MPD.
6. The media presentation time within the Representation that synchronizes closest to the live edge, MPTL.
7. The media presentation time within the Representation that synchronizes to other clients, MPTS.

Using these times, the client device can derive the values from above as:
1. The latest Period is obtained as the Period for which PST<=NTP.
2. The segment availability start time is obtained as $$SAST(k)=AST+PST+MST(k)+MD(k) \quad (4)$$

3. Within this Period the latest segment available on the client device is the segment at the position k* which results in the greatest value for SAST(k*) and at the same time is smaller than NTP.
4. The address of the latest segment is obtained by using the position information k* and then the segment address can be derived. The segment address depends on the addressing method.
5. Within this Period the greatest segment position k' that can be constructed by this MPD is the one that results in the greatest value for SAST(k') and at the same time is smaller than FT+MUP.

The client device can derive MPD times using this data. For example, if the @duration attribute is present and the value divided by the value of @timescale is denoted as d, then the client device, using conventional DASH techniques, derives the MPD times as:
MD(k)=d
MST(k)=(k−1)*d In the case that the Segment base information contains a SegmentTimeline element with $N_S$ S elements indexed with s=1, . . . , $N_S$, then (in DASH according to ISO/IEC 23009-1):
the t[s] is the value of @t of the s-th S element divided by the value of the @timescale attribute,
the d[s] is the value of @d of the s-th S element divided by the value of the @timescale attribute,
the r[s] is the value of @r of the s-th S element (unless the @r value is −1, which means that the value is unknown and the @d may be used until updated information is available)

Thus, the client device can derive the MPD duration and start times as follows:
k=0
for s=1, . . . $N_S$
  k=k+1
  MST(k)=t[s]
  MD(k)=d[s]
  for j=1, . . . , r[s]
    k=k+1
    MST(k)=MST(k−1)+d[s]
    MD(k)=d[s]

In DASH according to ISO/IEC 23009-1, the addressing method is independent of the usage of the timeline generation. The interpretation of the @startNumber depends on the addressing method. If the Representation contains or inherits one or more SegmentList elements, providing a set of explicit URL(s) for Media Segments, then the client device determines the position of the first segment in the segment list using @startNumber. The segment list then provides the explicit URLs. If the Representation contains or inherits a SegmentTemplate element with $Number$, then the URL of the media segment at position k is obtained by replacing the $Number$ identifier by (k−1)+@startNumber in the SegmentTemplate@media string. If the Representation contains or inherits a SegmentTemplate element with $Time$, then the client device obtains the URL of the Media Segment at position k by replacing the $Time$ identifier by MST(k) (de-normalized with the value if the @timescale attribute) in the SegmentTemplate@media string.

Furthermore, in DASH according to ISO/IEC 23009-1, the client device schedules the playout based on the available information in the MPD. The client device determines the media presentation time in a Period for each Representation as presentation time value in the media segments minus the value of the @presentationTimeOffset, if present, for each Representation. Each segment at position k has assigned an earliest media presentation time EPT(k).

By offering an MPD, DASH according to ISO/IEC 23009-1 guarantees that:
1. Each segment in this Period is available prior to its earliest presentation time and its duration, i.e., for all k, $$SAST(k)<=EPT(k)+(AST+PST)+MD(k) \quad (5)$$

2. If each segment with segment number k is delivered starting at SAST(k) over a constant bitrate channel with bitrate equal to value of the @bandwidth attribute, then each presentation time PT is available at the client latest at time PT+(AST+PST)+MBT+MD(k)
3. A recommended playout-time MPTS (PT) for a presentation time when operating in sync with other clients is MPTS(PT)=(AST+PST)+PT+SPD.
4. Each segment in this Period is available at least until SAST(k)+TSB+MD(k).

Using this information, the client device can start scheduling playout, taking into account the information in the MPD as well the download speed. A suitable playout time is POT (PT)=MPTS(PT), if the attribute @suggestedPresentationDelay is present. If the attribute @suggestedPresentationDelay is not present, then a suitable playout time takes into account the first, second, and fourth constraint, i.e., the segment availability times at the server as well as the bitrate variability of the media stream.

Under DASH according to ISO/IEC 23009-1, the client device can use the MPD to construct and request segments until media time FT+MUP and the greatest segment position k' that can be constructed by this MPD is the one that results in the greatest value for SAST(k') and at the same time is smaller than FT+MUP. The latest segment may be shorter than the other ones.

In case the template construction with @duration or with SegmentTimeline.S@r="−1" is used, the approach of DASH according to ISO/IEC 23009-1 may provide several advantages compared to the HLS and SmoothStreaming approach, such as
1. The MPD does not have to be updated on the server device as long as the segment construction can be continued. As long as the client device records the fetch time of the MPD, the client device can download the MPD ahead of time (or keep it in the buffer) for several different services.
2. Also, in a multicast environment, the MPD can be distributed only once or at least with a much smaller frequency than every second.
3. The client device has information indicating exactly the time when the next segment is available/published on the server device. This permits operation closer to the live edge as the client device request the segment as soon as the segment becomes available.
4. The client device can place the playout of the first segment the client device downloads accurately. The client device may even start playout in the middle of the segment to enable operation closer to the live edge.
5. The client device can synchronize its playout with other client devices.
6. Server device operation is simple, i.e., no dedicated server device is required Despite these potential advantages, the tighter timing control may also result in some issues that may need more detailed analysis. For example, under DASH according to ISO/IEC 23009-1, 1. The server device and the client device need to have accurate UTC timing. There is no requirement how to implement this, but it still requires implementation of a globally accurate timing standard on both ends. Among others, the following options exist:
   a. Network Time Protocol (NTP): http://www.ntp.org
   b. HTTP Time Protocol (HTP): http://www.clevervest.com/htp/
   c. HTTP Time Sync (HTS): http://netsecure.alcpress.com/htp/
   d. Global Positioning System (GPS)
   e. HTTP Date headers
   f. Direct signalling in the MPD with a RESTFUL API
   g. Direct signalling in the MPD
2. The server device may become overloaded, as all client devices may access the segment at the same time as the segment availability time is exposed explicitly.

This disclosure aims to enable accurate timing between client devices and server devices in a DASH environment.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise a combination of audio data and video data, e.g., one or more audio elementary stream and one or more video elementary streams. Each PES packet may include a stream_id that identifies the elementary stream to which the PES packet belongs. Encapsulation unit 30 is responsible for assembling elementary streams into video files of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. As noted above, in some instances, an adaptation set may also be referred to as a "representation group." That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets, in accordance with the techniques of this disclosure. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of server device 60.

In general, client device 40 and server device 60 may be configured to operate in accordance with DASH according to ISO/IEC 23009-1. However, client device 40 and server device 60 may be configured in accordance with the techniques of this disclosure to enable accurate timing between client device 40 and server device 60. For example, server device 60 may be configured to signal additional data in the MPD (e.g., manifest file 66) to support the timing between client device 40 and server device 60. In various examples (which may be used alone or in any combination), server device 60 may:
1. Signal additional information on NTP adding preferred servers,
2. Signal server devices that are recommended to be used for HTTP Time Protocol,
3. Signal an HTTP server device that responds with the accurate time based on a specific request. Different methods are used, and/or
4. Add the time directly in the MPD Thus, client device 40 and server device 60 may be configured to operate according to ISO/IEC 23009-1, with the following modification to Table 3 thereof (where the addition is noted using underlined text):

| Table 3 of ISO/IEC 23009-1 | | |
|---|---|---|
| ProgramInformation | 0 . . . N | specifies descriptive information about the program. For more details refer to the description in 5.7. |
| UTCTiming | 0 . . . N | specifies information on recommended way to obtain a synchronization to wall-clock time as used in this Media Presentation. For more details refer to 5.8.4.10. |
| BaseURL | 0 . . . N | specifies a Base URL that can be used for reference resolution and alternative URL selection. For more details refer to the description in 5.6. |

That is, Table 3 of ISO/IEC 23009-1 may be modified, in accordance with the techniques of this disclosure, to include an additional UTCTiming attribute that specifies information on a recommended way to obtain a synchronization to wall-clock time as used in the corresponding MPD (e.g., manifest file 66). Likewise, MPDs, such as manifest file 66 of FIG. 1, may include such a UTCTiming attribute. Accordingly, encapsulation unit 30 may form manifest file 66 to include the UTCTiming attribute as defined above, server device 60 may provide manifest file 66 to client device 40 including the UTCTiming attribute, and client device 40 and server device 60 may use the UTCTiming attribute to coordinate how wall-clock time can be obtained.

Table 3 of ISO/IEC 23009-1 may also be modified to include the addition noted below in underlined text:

```
        <!-- MPD Type -->
    <xs:complexType name="MPDtype">
        <xs:sequence>
            <xs:element name="ProgramInformation" type="ProgramInformationType" minOccurs="0" maxOccurs="unbounded"/>
            <xs:element name="UTCTiming" type="DescriptorType" minOccurs="0" maxOccurs="unbounded"/>
            <xs:element name="BaseURL" type="BaseURLType" minOccurs="0" maxOccurs="unbounded"/>
            <xs:element name="Location" type="xs:anyURI" minOccurs="0" maxOccurs="unbounded"/>
            <xs:element name="Period" type="PeriodType" maxOccurs="unbounded"/>
            <xs:element name="Metrics" type="MetricsType" minOccurs="0" maxOccurs="unbounded"/>
            <xs:any namespace="##other" processContents="lax" minOccurs="0" maxOccurs="unbounded"/>
        </xs:sequence>
        <xs:attribute name="id" type="xs:string"/>
        <xs:attribute name="profiles" type="xs:string" use="required"/>
        <xs:attribute name="type" type="PresentationType" default="static"/>
        <xs:attribute name="availabilityStartTime" type="xs:dateTime"/>
        <xs:attribute name="availabilityEndTime" type="xs:dateTime"/>
        <xs:attribute name="mediaPresentationDuration" type="xs:duration"/>
        <xs:attribute name="minimumUpdatePeriod" type="xs:duration"/>
        <xs:attribute name="minBufferTime" type="xs:duration" use="required"/>
        <xs:attribute name="timeShiftBufferDepth" type="xs:duration"/>
        <xs:attribute name="suggestedPresentationDelay" type="xs:duration"/>
        <xs:attribute name="maxSegmentDuration" type="xs:duration"/>
```

-continued

```
    <xs:attribute name="maxSubsegmentDuration" type="xs:duration"/>
    <xs:anyAttribute namespace="##other" processContents="lax"/>
</xs:complexType>
<!-- Presentation Type enumeration -->
<xs:simpleType name="PresentationType">
    <xs:restriction base="xs:string">
        <xs:enumeration value="static"/>
``` as a preference by the Media Presentation author. However, the client may choose any method, potentially having to deal with reduced accuracy. The client may also choose multiple methods in order to increase reliability and/or accuracy.

5.8.5.X DASH UTC Timing Schemes

DASH defines several methods on how to obtain additional information on the timing synchronization for the Media Presentation. Table X below shows different timing methods.

TABLE X

Different UTC timing Methods

| @schemeIdURI | Description |
|---|---|
| urn:mpeg:dash:utc:ntp:2012 | The identifier indicates that additional information on the NTP protocol [RFC5905] is provided. Specifically, the @value may list a white-space separated list of NTP servers that are recommended to be used in combination with the NTP protocol for synchronizing to the wall-clock time for this Media Presentation. |
| urn:mpeg:dash:utc:htp:2012 | The identifier indicates additional information for the HTTP Time Protocol (see http://www.clevervest.com/htp/) (HTP). Specifically, the @value may provide a white-space separated list of servers that are recommended to be used in combination with the HTP protocol for synchronizing to the wall-clock time for this Media Presentation. |
| urn:mpeg:dash:utc:http-head:2012 | The identifier indicates the recommended usage of HTTP protocol for time synchronization. Specifically, the @value may provide a white-space separated list of servers that may be used for obtaining timing information. HTTP HEAD method may be sent to any of these servers to obtain the Date information in the HTTP Header providing the appropriate time. |
| urn:mpeg:dash:utc:http-xsdate:2012 | The identifier indicates that by resolving the URL provided in the @value field, the server responds with a string that contains a time formatted according to xs:dateTime that is matching the time that is used to generate the MPD. |
| urn:mpeg:dash:utc:http-iso:2012 | The identifier indicates that by resolving the URL provided in the @value field, the server responds with a string that contains a time formatted according to iso timing format that is matching the time that is used to generate the MPD. |
| urn:mpeg:dash:utc:http-ntp:2012 | The identifier indicates that by resolving the URL provided in the @value field, the server responds with a string that contains a time formatted according to NTP time stamp that is matching the time that is used to generate the MPD. |
| urn:mpeg:dash:utc:direct-xsdate:2012 | The identifier indicates that the @value field, contains a time formatted according to xs:dateTime is matching the time that is used to generate the MPD at the time when the MPD was fetched from the server. |
| urn:mpeg:dash:utc:direct-iso:2012 | The identifier indicates that the @value field, contains a time formatted according to ISO timing format is matching the time that is used to generate the MPD at the time when the MPD was fetched from the server. |
| urn:mpeg:dash:utc:direct-ntp:2012 | The identifier indicates that the @value field, contains a time formatted according to NTP time stamp is matching the time that is used to generate the MPD at the time when the MPD was fetched from the server. |

The following MPD represents an example of an MPD implemented according to the above additions to ISO/IEC 23009-1:

-continued

```
        <xs:enumeration value="dynamic"/>
    </xs:restriction>
</xs:simpleType>
```

That is, ISO/IEC 23009-1 may be modified to include the element '<xs:element name="UTCTiming" type="DescriptorType" minOccurs="0" maxOccurs="unbounded"/>.'

Moreover, ISO/IEC 23009-1 may be modified to include the following sections:

5.8.4.10 UTC Timing Descriptor

For the element UTCTiming the Media Presentation author provides additional information how the client may suitably obtain accurate timing on how the Media Presentation is synchronized to the wall-clock time. Multiple schemes may be specified and the client is recommended to use the ordering

```
<MPD availabilityStartTime="2011-12-25T12:30:00"
    minimumUpdatePeriod="30s"
    suggestedPresentationDelay="15s"
    minBufferTime="5s"/>
<BaseURL>http://www.example.com/</BaseURL>
<UTCTiming schemeIDUri=" urn:mpeg:dash:utc:ntp:2012"
    value="time.nist.gov"/>
<UTCTiming schemeIDUri=" urn:mpeg:dash:utc:htp:2012"
    value="http://www.example.com http://www.example1.com"/>
<UTCTiming schemeIDUri=" urn:mpeg:dash:utc:http-head:2012"
    value="http://www.example.com http://www.example1.com"/>
<Period start="PT0S"/>
...
</Period>
```

```
<Period start="PT0.10S">
...
<SegmentTemplate timescale="48000" startNumber="22"
presentationTimeOffset="2016000" duration="96000"
initialization="audio/fr/init.mp4a" media="audio/fr/Number$.mp4"/>
...
</Period>
```

In this manner, any of the methods specified in the UTC Timing from above may be used to synchronize the time to UTC (such as a wall clock time).

More particularly, in the example of FIG. 1, client device 40 includes clock 56. Clock 56 represents an example of a local clock. In accordance with the techniques of this disclosure, client device 40 (and in particular, retrieval unit 52) may determine wall-clock times at which segments of media content will be available. Furthermore, client device 40 may synchronize clock 56 using the techniques of this disclosure. That is, manifest file 66 (e.g., an MPD file) may include information indicating a synchronization method by which client devices, such as client device 40, are to synchronize local clocks with wall-clock time, e.g., UTC time. Client device 40 may retrieve manifest file 66 and determine the synchronization method from manifest file 66. The information of manifest file 66 may further indicate one or more network addresses of servers from which client device 40 may retrieve accurate wall-clock times. Thus, client device 40 may request times from one or more of the servers using the synchronization method (e.g., a network-based time synchronization protocol, such as NTP, HTP, or HTTP). Retrieval unit 52 may then request a segment when the current time as indicated by clock 56 is at or after the wall-clock time indicated in manifest file 66 for the segment.

In certain environments, a content delivery network (CDN) (not shown in FIG. 1) may be configured to cause the client device to not access the Segments exactly at the time when the segments become available, or the CDN may be configured to cause only a subset of client devices to access the segments exactly at the segment availability times. Server device 60 may correspond to a server device of a CDN. Reasons for this may be that some clients populate the edge caches (i.e., their requests are routed to the origin server), whereas others are purposely delayed in order to serve those exclusively from the cache. In other examples, the CDN may prioritize certain client devices, e.g., those attempting to operate closer to the live edge, any may down-prioritize other client devices.

In still other examples, the CDN may allow certain Representations to be accessed in a prioritized manner, such that spreading of requests among client devices may also depend on the chosen Representation. At a high level, the following aspects may be implemented in ISO/IEC 23009-1 to support spreading the requests:
  Add signals to the MPD to initiate spreading of requests for segments.
    Client devices, based on some unique id (for example a MAC address or IP address or a specific cookie being set, or any other unique identifier, possibly also based on a request), are randomly assigned to a certain type of receiver. The ID may also include means such that certain clients are prioritized.
    Based on this ID, a client may schedule the requests for segments at availability start times or with some delay. The delay is a random variable drawn from some distribution The distribution may be uniformly distributed over some time interval, or may be any other distribution.

The signal may also be added for each Representation, as for example there may be preference for some Representations to be accessible faster.

Encapsulation unit 30 may form NAL units comprising a header that identifies a program to which the NAL belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 second. During this time interval, the specific frames for all views of the same access unit (the same time instance) may be rendered simultaneously. In one example, an access unit may comprise a coded picture in one time instance, which may be presented as a primary coded picture. Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Video encoder 28, video decoder 48, audio encoder 26, audio decoder 46, encapsulation unit 30, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, and/or encapsulation unit 30, and/or decapsulation unit 50 may comprise an integrated circuit, a microprocessor, and/or a wireless communication device, such as a cellular telephone.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
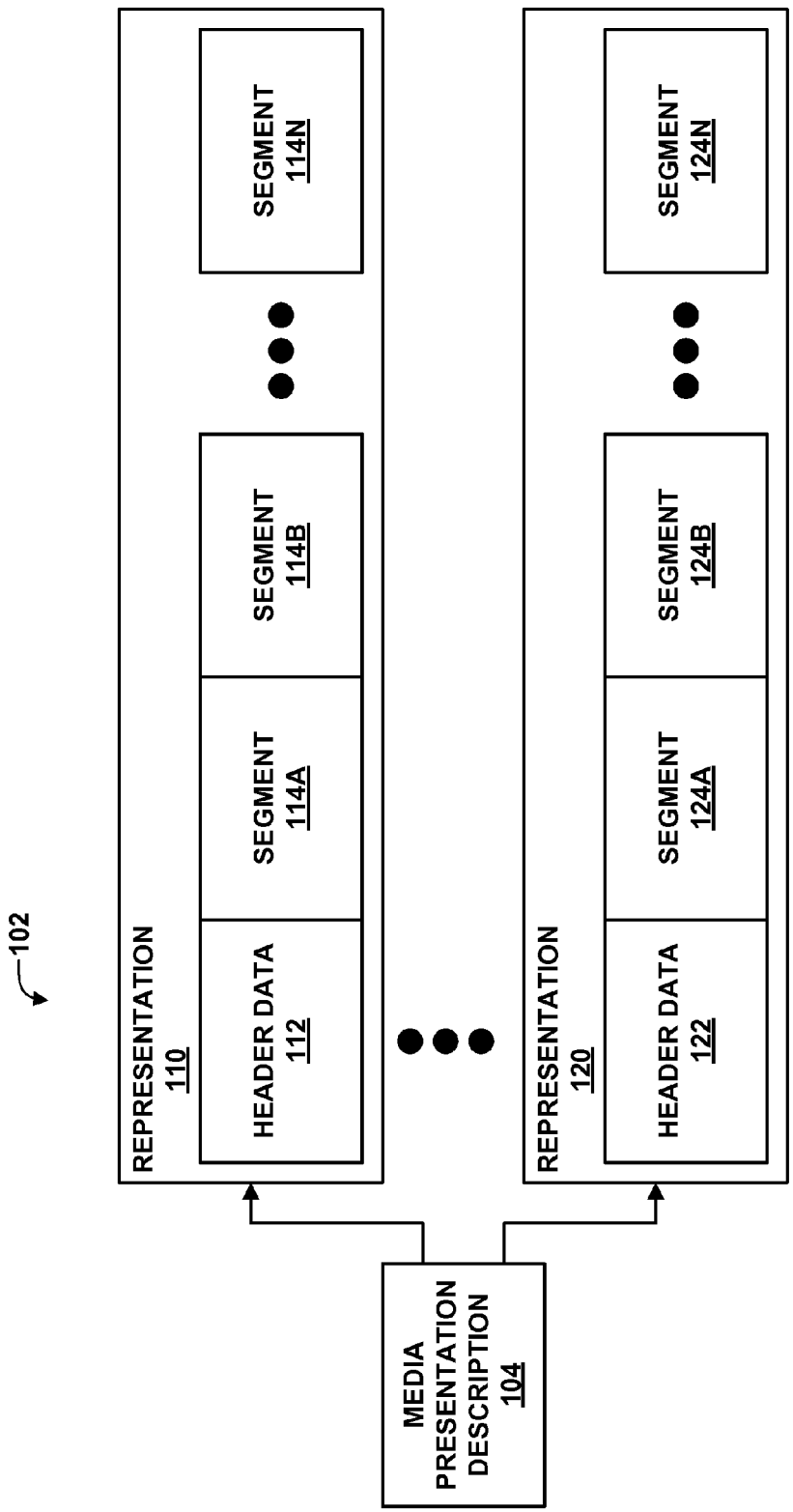
FIG. 2 is a conceptual diagram illustrating elements of example multimedia content.

FIG. 2 is a conceptual diagram illustrating elements of example multimedia content 102. Multimedia content 102 may correspond to multimedia content 64 (FIG. 1), or another multimedia content stored in storage medium 62. In the example of FIG. 2, multimedia content 102 includes media presentation description (MPD) 104 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110, 120 as a matter of convenience. In some examples, there may be different numbers of movie fragments between representations 110, 120.

MPD 104 may comprise a data structure separate from representations 110-120. MPD 104 may correspond to manifest file 66 of FIG. 1. Likewise, representations 110-120 may correspond to representations 68 of FIG. 1. In general, MPD 104 may include data that generally describes characteristics of representations 110-120, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback). In accordance with the techniques of this disclosure, MPD 104 may include UTCTiming information, as discussed above with respect to FIG. 1.

Header data 112, when present, may describe characteristics of segments 114, e.g., temporal locations of random access points (RAPS, also referred to as stream access points (SAPs)), which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 104.

Segments 114, 124 include one or more coded video samples, each of which may include frames or slices of video data. Each of the coded video samples of segments 114 may have similar characteristics, e.g., height, width, and bandwidth requirements. Such characteristics may be described by data of MPD 104, though such data is not illustrated in the example of FIG. 2. MPD 104 may include characteristics as described by the 3GPP Specification, with the addition of any or all of the signaled information described in this disclosure.

Each of segments 114, 124 may be associated with a unique uniform resource locator (URL). Thus, each of segments 114, 124 may be independently retrievable using a streaming network protocol, such as DASH. In this manner, a destination device, such as client device 40, may use an HTTP GET request to retrieve segments 114 or 124. In some examples, client device 40 may use HTTP partial GET requests to retrieve specific byte ranges of segments 114 or 124.

Figure 3:
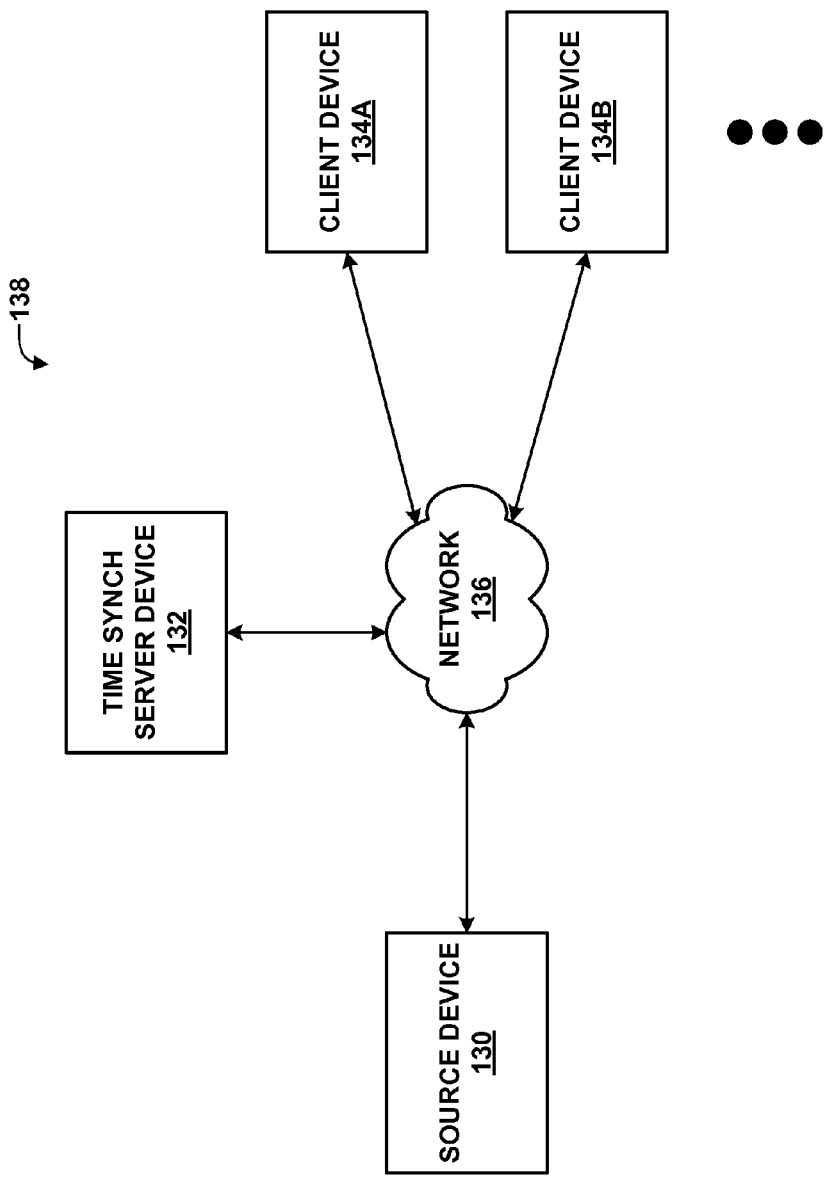
FIG. 3 is a conceptual diagram illustrating a system including various devices that may implement the techniques of this disclosure.

FIG. 3 is a conceptual diagram illustrating a system 138 including various devices that may implement the techniques of this disclosure. In this example, system 138 includes source device 130, time synchronization (synch) server device 132, and a plurality of client devices including client device 134A and client device 134B (client devices 134). These devices are interconnected via network 136, which may correspond to the Internet. In general, source device 130 may correspond to either or a combination of content preparation device 20 and server device 60 of FIG. 1, client devices 134 may include components substantially similar to those of client device 40 of FIG. 1, and network 136 may correspond to network 74 of FIG. 1. The functionality attributed to time synch server device 132 may be performed by source device 130, but is illustrated separately for purposes of discussion.

In accordance with the techniques of this disclosure, source device 130 may construct a manifest file, such as a media presentation description (MPD), that indicates wall-clock times at which client devices 134 can retrieve data of media content, e.g., segments. The MPD may further indicate a synchronization method by which client devices 134 are to synchronize respective local clocks to wall clock times. For instance, source device 130 may provide an Internet protocol (IP) address or domain name for time synch server device 132 in the MPD, along with an indication of the synchronization method. In this manner, client devices 134 may use the synchronization method to request a current time from time synch server device 132, in order to synchronize local clocks with wall-clock times. The time synchronization methods may include, for example, network time protocol (NTP), precision time protocol (PTP), hypertext transfer protocol (HTTP) Time Protocol (HTP), or HTTP itself.

As explained above, source device 130 may provide an MPD to client devices 134A, 134B that includes information for a recommended way to synchronize local clocks of client devices 134A, 134B to wall-clock time for the corresponding media Presentation. Table 3 of ISO/IEC 23009-1, including the example modifications discussed above, represents an example element, UTCTiming, that can be used to signal such information. Thus, client devices 134A, 134B may use this signaled information to interact with time synch server device 132, in order to synchronize their respective local clocks with wall-clock times. Additionally, source device 130 may synchronize its local clock with time synch server device 132, in some examples.

When using HTTP to synchronize a local clock, client devices 134 may send an HTTP HEAD request to time synch server device 132. The HTTP HEAD request may conform to RFC 2616, which defines HTTP/1.1. In response to the HTTP HEAD request, time synch server device 132 may send a response including date information, e.g., a date and a time. Alternatively, client devices may send an HTTP GET request to time synch server device 132 in conformance with RFC 2616. In response, time synch server device 132 may send a well-formatted time stamp value, e.g., a time stamp value formatted according to NTP or Extensible Markup Language (XML) or to an NTP time stamp or an ISO time code.

In addition, or in the alternative, source device 130 may signal an indication in an MPD that different client devices are to retrieve a particular segment of media data at different times. This may avoid scenarios in which a large number of client devices retrieve the same segment at substantially the same time. For instance, the indication may cause client device 134A to retrieve a particular segment at a different time than client device 134B. Thus, client device 134A may retrieve the segment at a first time, as indicated in the MPD, and client device 134B may retrieve the segment at a second time different than the first time, again as indicated in the MPD. In particular, client devices 134A, 134B may issue requests for the segment at different times.

Although only one time synch server device 132 is shown in the example of FIG. 3, it should be understood that multiple time synch server devices may be provided, and source device 130 may indicate addresses of each of the time synch server devices in an MPD.

Time synch server device 132 may be configured as an NTP server. In accordance with NTP, time synch server device 132 may represent a reference clock or a lower stratum clock that is communicatively coupled to a reference clock. Client devices 134A, 134B may be configured to send requests to time synch server device 132 and additional time synch server devise; an NTP client may, for example, send requests to three different NTP servers. In accordance with NTP, client devices 134A, 134B may determine a timestamp at which a request is sent to time synch server device 132, a timestamp of receipt of the request, a timestamp at which a response packet from time synch server device 132 is sent in response to the request, and a timestamp at which the response packet is received. Client devices 134A, 134B may use these timestamps to determine the actual time and adjust their internal clocks accordingly. In some examples, client devices 134A, 134B may periodically repeat the NTP procedure to re-adjust their internal clocks, to prevent or counteract time slippage.

Additionally or alternatively, time synch server device 132 may be configured as an HTTP server. In accordance with HTP, time synch server device 132 may provide date and time information in HTTP packet headers. In particular, client devices 134A, 134B may receive packets from time synch server device 132 and/or one or more additional HTTP servers. Client devices 134A, 134B may calculate the average of times received from one or more time synch server devices, including time synch server device 132, to derive a current time (potentially excluding certain received times from the time synch server devices, e.g., times outside of one standard deviation of the average of all of the received times). Client devices 134A, 134B may also add the time required to perform the calculations of the averages and standard deviations.

Client devices 134A, 134B may then adjust their internal clocks according to the calculated time.

In some examples, time synch server device 132 and source device 130 may be functionally integrated into the same device. For instance, in response to a request for an MPD, source device 130 may send the MPD as well as a well-formatted time stamp, such as an NTP or XML timestamp. Alternatively, time synch server device 132 may be provided separately from source device 130, as shown in the example of FIG. 3, but source device 130 may also act as a time synch server device, e.g., by providing the well-formatted time stamp value and/or by acting as a server for a time synchronization protocol, such as NTP, HTP, HTTP, or other such protocols. Likewise, time synch server device 132, separate from source device 130, may be configured to provide a well-formatted time stamp, such as an NTP or XML timestamp, in response to an HTTP GET request. For instance, client devices 134A, 134B may issue an HTTP GET request directed to a particular URL, and in response, time synch server device 132 may send a well-formatted time stamp, e.g., formatted according to NTP or XML.

In this manner, client devices 134A, 134B represent examples of a client device for receiving information for streaming of media data, including a clock and one or more processors configured to receive a media presentation description (MPD) for media content, wherein the MPD includes data indicative of wall-clock times at which the client device can retrieve data of the media content from a source device, and wherein the data indicates a synchronization method by which the client device is to synchronize the wall-clock times with the clock, synchronize the clock with the wall-clock times using the method indicated by the MPD, and request data of the media content from the source device using the synchronized clock. The MPD may include data that indicates that client device 134A, for example, is to retrieve a segment of the media content at a first time and that client device 134B, in this example, is to retrieve the segment at a second time different from the first time.

Likewise, source device 130 represents an example of a source device for signaling information for streaming of media data, including one or more processors configured to generate data for a media presentation description (MPD) for media content, wherein the MPD includes data indicative of wall-clock times at which a client device (e.g., one of client devices 134A, 134B) can retrieve data of the media content from the source device, and wherein the generated data indicates a synchronization method by which the client device is to synchronize the wall-clock times with a clock of the client device, and send the MPD to the client device.

Figure 4:
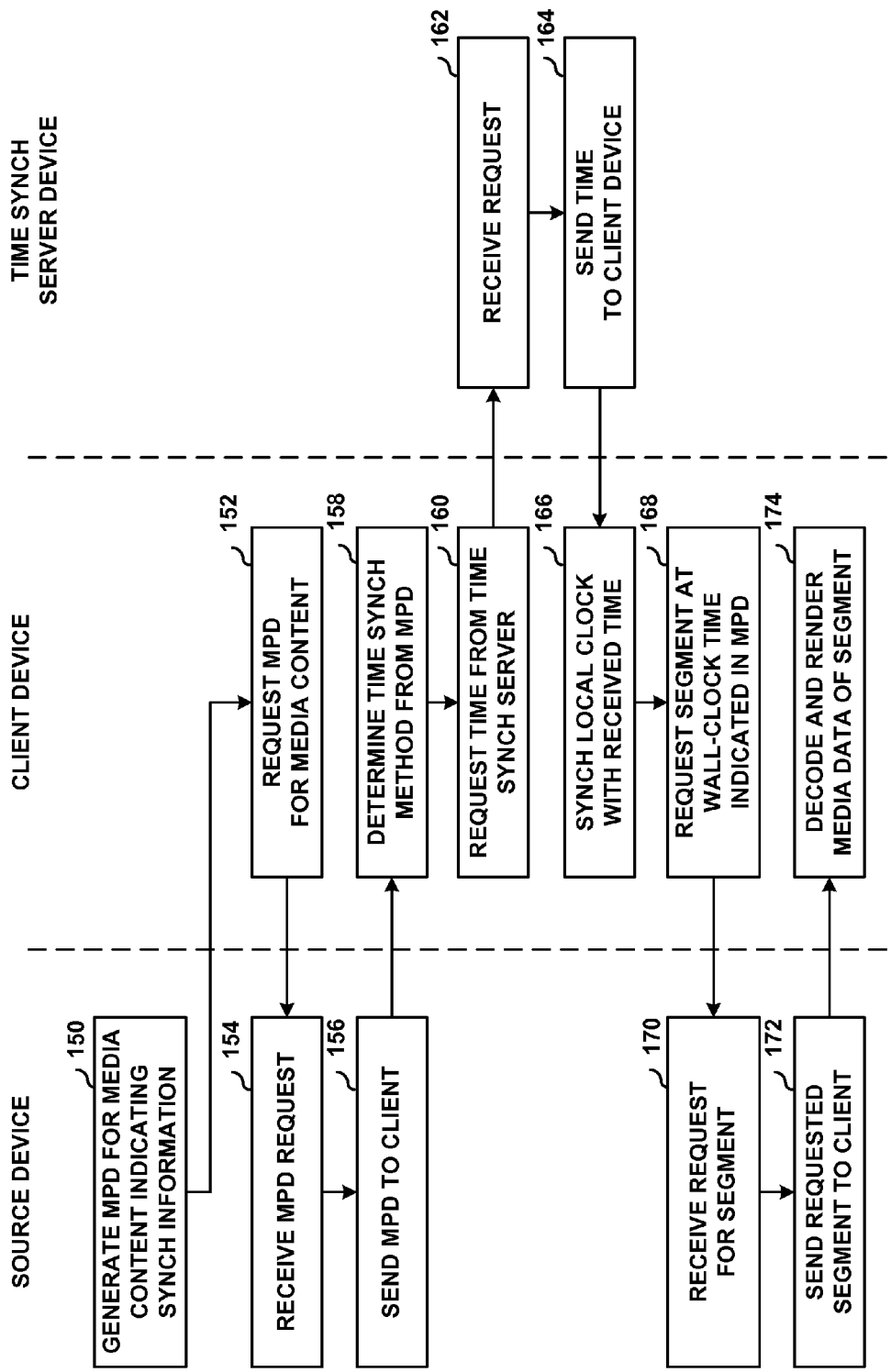
FIG. 4 is a flowchart illustrating an example method of synchronizing a local clock of a client device with a wall-clock time and retrieving a segment using the synchronized clock.

FIG. 4 is a flowchart illustrating an example method of synchronizing a local clock of a client device with a wall-clock time and retrieving a segment using the synchronized clock. The method of FIG. 4 is described with respect to source device 130, client device 134A, and time synch server device 132 of FIG. 3. However, it should be understood that other devices (e.g., client device 40, server device 60, and/or content preparation device 20 of FIG. 1, and/or client device 134B of FIG. 3) may be configured to perform this or a substantially similar method. In addition, certain steps of the method of FIG. 4 may be performed in alternative orders or in parallel, and may be performed by other devices (for instance, steps attributed to the time synch server device 132 may be performed by source device 130).

Initially, source device 130 may generate a media presentation description (MPD) for media content (e.g., a media Presentation), where the MPD includes information indicating time synchronization information (150). For instance, source device 130 may include information in the MPD indicative of a synchronization method (e.g., NTP, HTP, or HTTP) and addresses for one or more time synchronization servers, such as time synch server device 132. The time synchronization information may correspond to the UTCTiming element described above with respect to the modified version of Table 3 of ISO/IEC 23009-1. In addition, the MPD may advertise wall-clock times at which segments of the media content will be available for retrieval. In some examples, these wall-clock times may be different for different client devices. For instance, a segment may be available at a first time for client device 134A, but a second, different time for client device 134B. That is, the MPD may indicate a first time when client device 134A can retrieve the segment, and a second, different time when client device 134B can retrieve the segment.

Client device 134A may then request the MPD for the media content (152). In general, client device 134A may request a manifest file for the media content. An MPD is one example of a manifest file, although other types of manifest files may be used in other examples. Source device 130 may receive the request for the MPD (154) and then send the MPD to client device 134A (156) in response to the request.

Client device 134A may use the MPD to determine a time synchronization method (158). For instance, client device 134A may determine whether to synchronize a local clock using NTP, HTP, HTTP, or another time synchronization method using the MPD. Client device 134A may also determine an address of a time synchronization server device, such as time synch server device 132, from the MPD. Client device 134A may then request a time from time synch server device 132 (160). Time synch server device 132 may receive the request (162) and in response to the request, send an indication of the current time to client device 134A (164). Client device 134A may then synchronize its local clock with the received time (166). For instance, client device 134A may reset the time of its local clock directly, or may run the local clock at a faster or slower rate to reach the indicated time. In some examples, client device 134A may request times from a plurality of different time synchronization servers, and combine times received from these servers (e.g., through averaging) to determine an actual current time, and synchronize with this determined time, rather than the time indicated by a particular server. Furthermore, client device 134A may calculate processing times and add these processing times to the indicated time when resetting the local clock.

After resetting the local clock, client device 134A may determine a wall clock time at which a segment of the media content will be available from the MPD. Client device 134A may then request a segment at the wall-clock time indicated in the MPD, that is, the time at which the MPD indicates that the segment is available for retrieval (168). Client device 134A may form an HTTP GET or partial GET request for the segment, or a portion thereof. Source device 130 may receive the request for the segment (170) and send the requested segment (or portion thereof) to client device 134A (172) in response to the request. After receiving the segment, client device 134A may decode and render media data of the segment (174). Prior to decoding and rendering, client device 134A may buffer the received segment, until the data of the segment is ready to be decoded and presented.

In this manner, FIG. 4 represents an example of a method of receiving information for streaming of media data, the method including receiving, by a client device, a media presentation description (MPD) for media content, wherein the MPD includes data indicative of wall-clock times at which the client device can retrieve data of the media content from a source device, and wherein the data indicates a synchronization method by which the client device is to synchronize the wall-clock times with a clock of the client device, synchronizing the clock of the client device with the wall-clock times using the method indicated by the MPD, and requesting data of the media content from the source device using the synchronized clock.

Additionally, FIG. 4 represents an example of a method of signaling information for streaming of media data, the method comprising, generating data for a media presentation description (MPD) for media content, wherein the MPD includes data indicative of wall-clock times at which a client device can retrieve data of the media content from a source device, and wherein the generated data indicates a synchronization method by which the client device is to synchronize the wall-clock times with a clock of the client device, and sending the MPD to the client device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of receiving information for streaming of media data, the method comprising:
   receiving, by a client device, a media presentation description (MPD) for media content, wherein the MPD includes data indicative of wall-clock times at which the client device can retrieve segments of the media content from a source device, wherein the data indicates a synchronization method by which the client device is to synchronize the wall-clock times with a clock of the client device, and wherein the synchronization method indicated by the MPD comprises one of network time protocol (NTP), HTTP Time Protocol (HTP), or HTTP;
   prior to retrieving any of the segments, synchronizing the clock of the client device with the wall-clock times using the method indicated by the MPD,
      wherein when the synchronization method comprises NTP, the MPD includes data indicative of network addresses for one or more NTP servers, and wherein synchronizing the clock comprises requesting a time from at least one of the NTP servers, and
      wherein when the synchronization method comprises HTP or HTTP, the MPD includes data indicative of network addresses for one or more HTTP servers, and wherein synchronizing the clock comprises requesting the time from at least one of the HTTP servers;
   determining, from the MPD, a time at which a segment of the segments of the media content can be retrieved; and
   requesting the segment of the media content from the source device when the synchronized clock indicates that a current time is equal to or greater than the time at which the segment can be retrieved.

2. The method of claim 1, wherein the synchronization method comprises HTTP, and wherein synchronizing the clock comprises sending an HTTP HEAD request to at least one of the HTTP servers and receiving, in response to the HTTP HEAD request, date information from the at least one of the HTTP servers in an HTTP Header.

3. The method of claim 1, wherein the synchronization method comprises HTTP, and wherein synchronizing the clock comprises sending an HTTP GET request to at least one of the HTTP servers and receiving, in response to the HTTP GET request, a well-formatted time stamp value that is formatted according to one of network time protocol (NTP) and Extensible Markup Language (XML) and an international organization for standardization (ISO) time code.

4. The method of claim 1, wherein the MPD includes data that indicates that the client device is to retrieve a segment of the media content at a first time and that a separate client device is to retrieve the segment at a second time different from the first time, and wherein requesting data comprises requesting the segment at or after the first time.

5. A client device for receiving information for streaming of media data, the client device comprising:
   a clock; and
   one or more processors configured to:
      receive a media presentation description (MPD) for media content, wherein the MPD includes data indicative of wall-clock times at which the client device can retrieve segments of the media content from a source device, wherein the data indicates a synchronization method by which the client device is to synchronize the wall-clock times with the clock, and wherein the synchronization method indicated by the MPD comprises one of network time protocol (NTP), HTTP Time Protocol (HTP), or HTTP,
      prior to retrieving any of the segments, synchronize the clock with the wall-clock times using the method indicated by the MPD,
         wherein when the synchronization method comprises NTP, the MPD includes data indicative of network addresses for one or more NTP servers, and wherein the one or more processors are configured request a time from at least one of the NTP servers, and
         wherein when the synchronization method comprises HTP or HTTP, the MPD includes data indicative of network addresses for one or more HTTP servers, and wherein the one or more processors are configured to request the time from at least one of the HTTP servers;
      determine, from the MPD, a time at which a segment of the segments of the media content can be retrieved; and
      request the segment of the media content from the source device when the synchronized clock indicates that a current time is equal to or greater than the time at which the segment can be retrieved.

6. The client device of claim 5, wherein the synchronization method comprises HTTP, and wherein to synchronize the clock, the one or more processors are configured to send an HTTP HEAD request to at least one of the HTTP servers and receive, in response to the HTTP HEAD request, date information from the at least one of the HTTP servers in an HTTP Header.

7. The client device of claim 5, wherein the synchronization method comprises HTTP, and wherein to synchronize the clock, the one or more processors are configured to send an HTTP GET request to at least one of the HTTP servers and receive, in response to the HTTP GET request, a well-formatted time stamp value that is formatted according to one of network time protocol (NTP) and Extensible Markup Language (XML).

8. The client device of claim 5, wherein the MPD includes data that indicates that the client device is to retrieve a segment of the media content at a first time and that a separate client device is to retrieve the segment at a second time different from the first time, and wherein the one or more processors are configured to request the segment at or after the first time.

9. A non-transitory computer-readable storage medium having stored thereon instructions that, when executed, cause a processor of a client device to:
    receive a media presentation description (MPD) for media content, wherein the MPD includes data indicative of wall-clock times at which the client device can retrieve segments of the media content from a source device, wherein the data indicates a synchronization method by which the client device is to synchronize the wall-clock times with a clock of the client device, and wherein the synchronization method indicated by the MPD comprises one of network time protocol (NTP), HTTP Time Protocol (HTP), or HTTP;
    prior to retrieving any of the segments, synchronize the clock of the client device with the wall-clock times using the method indicated by the MPD,
        wherein when the synchronization method comprises NTP, the MPD includes data indicative of network addresses for one or more NTP servers, and wherein the instructions that cause the processor to synchronize the clock comprise instructions that cause the processor to request a time from at least one of the NTP servers, and
        wherein when the synchronization method comprises HTP or HTTP, the MPD includes data indicative of network addresses for one or more HTTP servers, and wherein the instructions that cause the processor to synchronize the clock comprise instructions that cause the processor to request the time from at least one of the HTTP servers;
    determine, from the MPD, a time at which a segment of the segments of the media content can be retrieved; and
    request the segment of the media content from the source device when the synchronized clock indicates that a current time is equal to or greater than the time at which the segment can be retrieved.

10. The non-transitory computer-readable storage medium of claim 9, wherein the synchronization method comprises HTTP, and wherein synchronizing the clock comprises sending an HTTP HEAD request to at least one of the HTTP servers and receiving, in response to the HTTP HEAD request, date information from the at least one of the HTTP servers in an HTTP Header.

11. The non-transitory computer-readable storage medium of claim 9, wherein the synchronization method comprises HTTP, and wherein synchronizing the clock comprises sending an HTTP GET request to at least one of the HTTP servers and receiving, in response to the HTTP GET request, a well-formatted time stamp value that is formatted according to one of network time protocol (NTP) and Extensible Markup Language (XML).

12. The non-transitory computer-readable storage medium of claim 9, wherein the MPD includes data that indicates that the client device is to retrieve a segment of the media content at a first time and that a separate client device is to retrieve the segment at a second time different from the first time, and wherein requesting data comprises requesting the segment at or after the first time.

13. A method of signaling information for streaming of media data, the method comprising:
    generating data for a media presentation description (MPD) for media content, wherein the MPD includes data indicative of wall-clock times at which a client device can retrieve segments of the media content from a source device, wherein the generated data indicates a synchronization method by which the client device is to synchronize the wall-clock times with a clock of the client device, and wherein the synchronization method indicated by the MPD comprises one of network time protocol (NTP), HTTP Time Protocol (HTP), or HTTP,
        wherein when the synchronization method comprises NTP, generating the data for the MPD comprises generating the data to indicate that the synchronization method comprises NTP and to indicate network addresses for one or more NTP servers from which to request data for synchronizing the clock of the client device with the wall-clock times;
        wherein when the synchronization method comprises HTP, generating the data for the MPD comprises generating the data to indicate that the synchronization method comprises HTP and to indicate network addresses for one or more HTTP servers from which to request data for synchronizing the clock of the client device with the wall-clock times;
        wherein when the synchronization method comprises HTTP, generating the data comprises generating the data to indicate that the synchronization method comprises HTTP and to indicate the network addresses for the one or more HTTP servers from which to request data for synchronizing the clock of the client device with the wall-clock times; and outputting the MPD.

14. The method of claim 13, further comprising:
receiving a request for a segment of the media content following a wall-clock time for the segment as indicated by the MPD; and
sending the segment to the client device in response to the request.

15. The method of claim 14, further comprising:
receiving a first request for the segment from the first client device at or after the first time;
sending data for the segment to the first client device in response to the first request;
receiving a second request for the segment from the second client device at or after the second time; and
sending the data for the segment to the second client device in response to the second request.

16. The method of claim 15, wherein generating the data comprises generating specific values for the first time and the second time.

17. The method of claim 15, further comprising determining a first priority for the first client device and a second priority for the second client device, wherein generating the data comprises generating the data based on the first priority and the second priority.

18. The method of claim 13, wherein the client device comprises a first client device, and wherein generating the data for the MPD comprises generating the data for the MPD such that the data indicates that the first client device is to retrieve a segment of the media content at a first time and that a second client device is to retrieve the segment at a second time different from the first time, and wherein sending the MPD comprises sending the MPD to the first client device and the second client device.

\* \* \* \* \*